W. S. DILLEHAY.
Straw Cutter.
No. 10,362.
Patented Jan. 3, 1854.
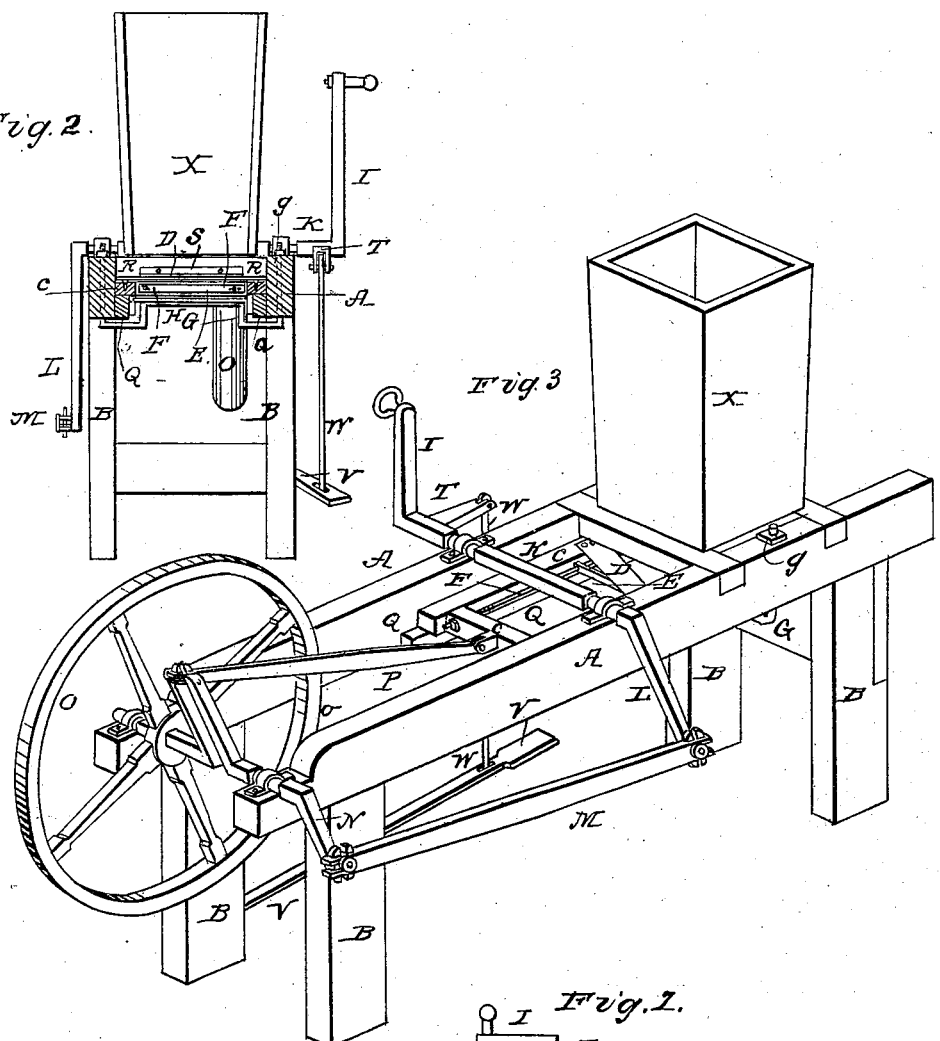
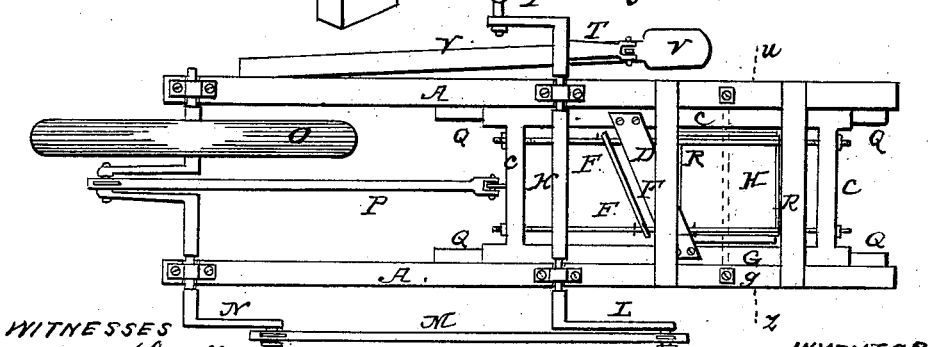
WITNESSES
INVENTOR

UNITED STATES PATENT OFFICE.

WILLIAM S. DILLEHAY, OF SHELBY COUNTY, KENTUCKY.

STRAW-CUTTER.

Specification of Letters Patent No. 10,362, dated January 3, 1854.

*To all whom it may concern:*

Be it known that I, WILLIAM S. DILLEHAY, of the county of Shelby and State of Kentucky, have invented a new and useful Improvement in Machines for Cutting Straw, &c.; and I do hereby declare that the following is a full, clear, and exact description of the construction and operation of the same, reference being had to the annexed drawings, making a part of this specification, in which—

Figure 1 is a top view of the machine with the hopper removed; Fig. 2 a transverse section at the line marked U Z red shade Fig. 1. Fig. 3 is a perspective view.

The same letters in all the figures, denote the same part of the machine.

A A, are top pins of frame 2 inches thick and 6 inches deep, and 6 feet long, and 20 inches wide connected by two cross ties, which is either let in as per drawing, or tenoned into the side pieces of the frame, on which the hopper rests, (exhibited but not marked in the drawing Figs. 1 and 3;) B, B, legs of same size as top pieces and 2 feet high; C, gate or frame for knife, side pieces 3 feet long and 2 inches wide, by 1½ inches thick, put together by the end pieces marked c, mortised in the edge of the side pieces, and to be 16 inches wide, so as to play between the side pieces of the frame of the machine, on which the knife D is fastened by screws or other means, diagonally, 23 degrees with a right angle of the side piece, with two edges, and two inches wide, cutting both ways, viz. backward and forward, the flat side of the knife upward next the steel, two rods marked F F are to run parallel through the end pieces of the knife frame or gate, and to be 9½ inches in the clear between the rods, which is about ⅜ or 7/16 of an inch diameter, having stops, pins, or otherwise to cause the scraper to lie in its proper place, and to be a little below the center of the knife frame or gate, so as to let the scraper pass between the knife and gage table marked H in the drawing, it being 9 inches square and supported by an iron marked G Fig. 2, having nuts to regulate by means of a screw to cut long or short. On this table the iron scraper marked E about ½ inch wide and ¼ inch thick having a hole diagonally through each end, for to play on the rods parallel with the edges of the knife, and be kept to its place by the pins or stops on the rods, and to be admitted to play on the rods about 4 inches, so that in cutting oats or straw they will not choke between the scraper and knife. The lower steels, which is fastened at each end of the cleats marked 2, immediately under the upper steel, so as to be stationed that the knife may pass over, and the scraper under them, that the knife may cut clear through the sheaf. These steels to be one inch wide, and about one eighth, or three sixteenths of an inch thick, to be bent at right angles so as merely to let the scraper pass, and the gage table may be kept clean of the article cut. A vertical work lever marked in drawing I, 20 inches long with a horizontal or vertical handle, attached to the axis or work shaft marked K, on the other end of the shaft is a work lever crank marked L 16 inches long antipode with the lever I, this axis or rock shaft, to have two arbors or journals to play on suitable pillow blocks, and of sufficient size for the strength of the operator, to drive by a common pitman marked M, from the lever cranked L, to the revolving crank of the fly wheel marked N, and 8 inches long, with a bowed axle or double armed crank of 9½ inches, so as to make a stroke of 19 inches, so as the scraper will be past the steel fastened on the frame below the bottom of the hopper, that the knife may always be behind the straw to be cut by its reciprocations. The fly wheel marked O to be 3 feet 6 inches diameter and about 100 pounds to be worked by hand; but if by horse or other power, the machine to be proportioned to the motor. Attached to the double armed crank is a common pitman marked P to propel the movements of the knife gate or frame, being supported by the cleats marked 2,—about 4 feet long and to be made fast with screws or otherwise, to the inside of the frame A, A, so that the knife with its appendages may just have sufficient room to pass and repass under the cross ties which is either let in or tenoned into the side pieces, (as above remarked) on which the hopper is supported. These cleats to be 1¼ inches thick and 2¼ inches wide, the side lie horizontal. Attached to the leg under the fly wheel axis, right side to work the machine, is the lever and treadle marked V V coupled to the rock shaft by the rod or tram marked W to the reverse lever marked T, the arm of the reverse lever to be at right angles to I, and is 7 inches long.

The hopper 9 inches square at the bottom in the clear, and 12 inches at the top, so as to receive a common sheaf marked H confined to the frame by a hinge or otherwise.

What I claim as my invention, and desire to secure by Letters Patent, is—

The diagonal knife with two edges, in combination with the movable scraper, with its proper appendages, and the manner of its movements parallel with the edges of the knife, thereby clearing the gage table of all the cut straw.

The double arm crank, and the other cranks fly wheel and pitmen I do not claim, they have been long known to mechanics.

WM. S. DILLEHAY.

Witnesses:
 ALLEN S. KIRK,
 FIELDING LATTRELL.